June 3, 1952          D. F. SHERMAN          2,599,136
ADJUSTABLE WHEEL AND AXLE ASSEMBLY
Filed June 21, 1950          4 Sheets—Sheet 1
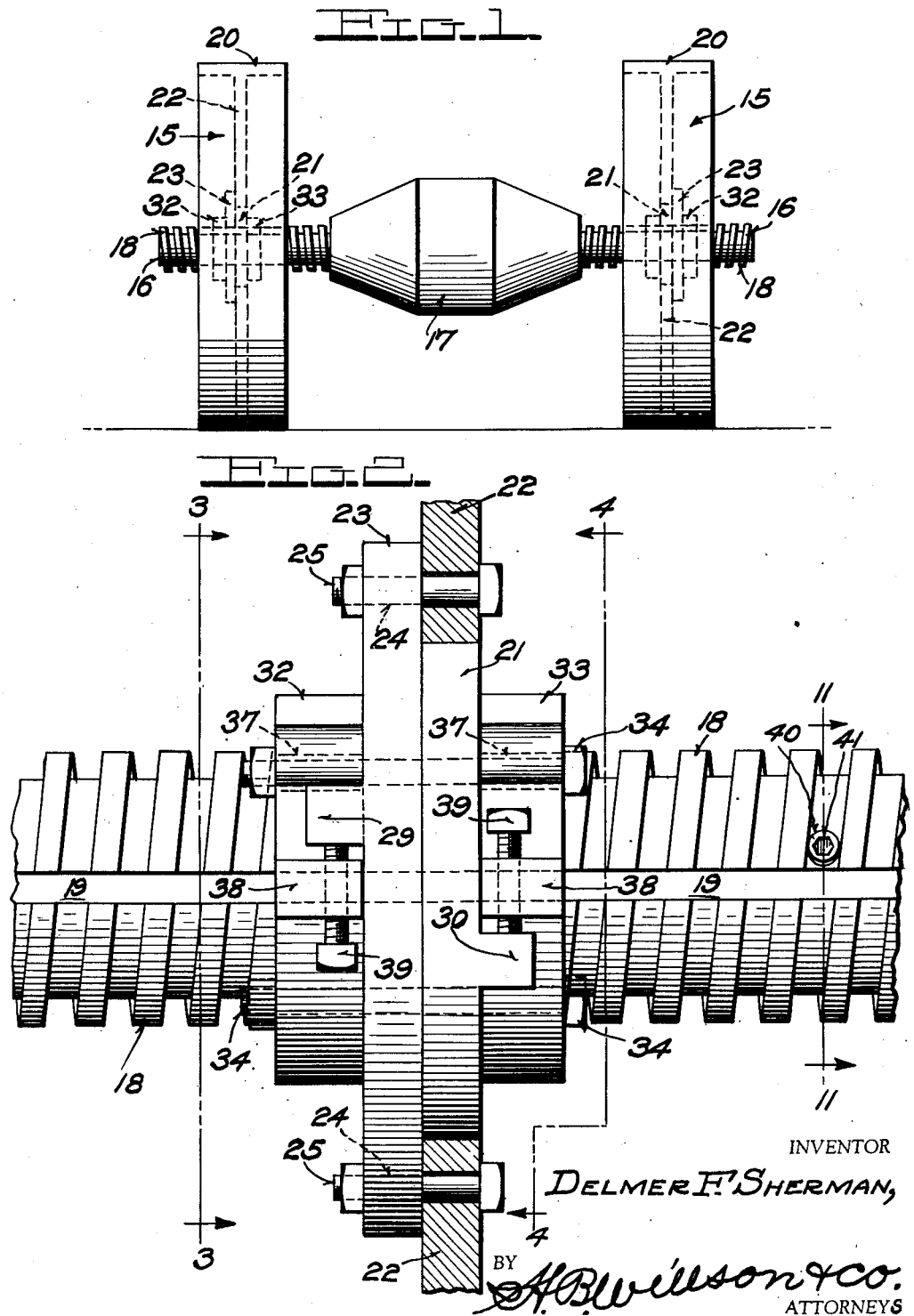
INVENTOR
DELMER F. SHERMAN,
BY H. B. Willson & Co.
ATTORNEYS

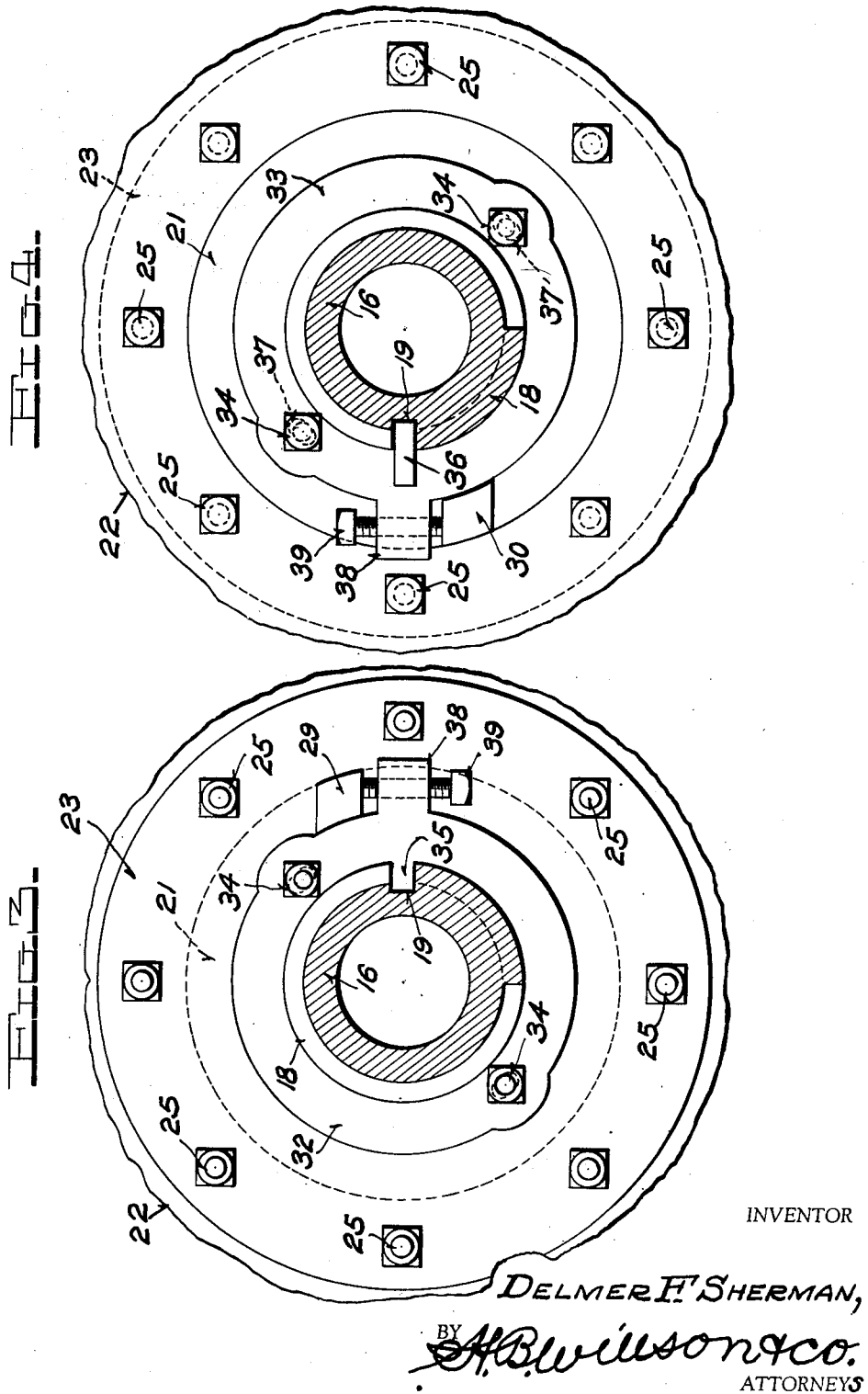

June 3, 1952   D. F. SHERMAN   2,599,136
ADJUSTABLE WHEEL AND AXLE ASSEMBLY
Filed June 21, 1950   4 Sheets-Sheet 3
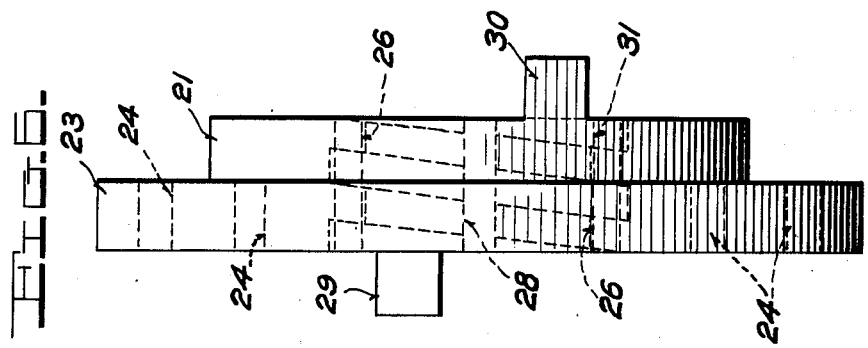
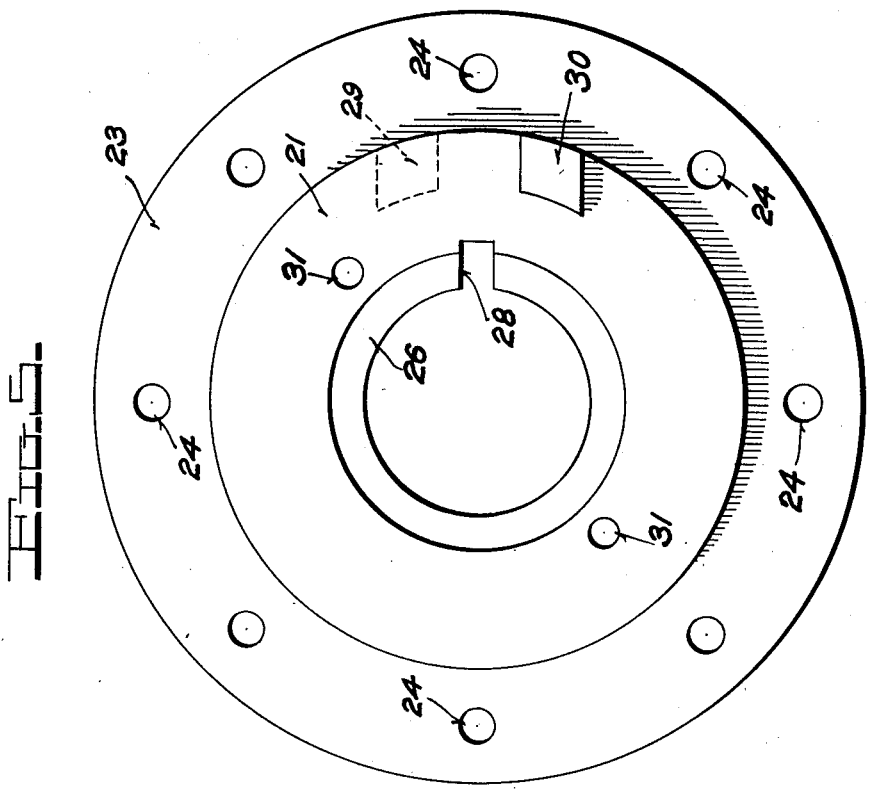
INVENTOR
DELMER F. SHERMAN,
BY H. B. Willson & Co.
ATTORNEYS June 3, 1952 D. F. SHERMAN 2,599,136
ADJUSTABLE WHEEL AND AXLE ASSEMBLY
Filed June 21, 1950 4 Sheets-Sheet 4
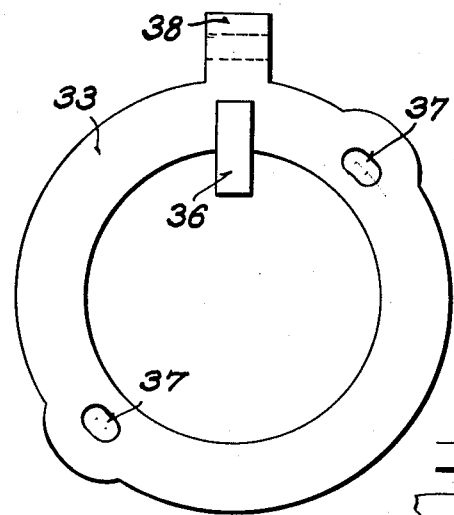
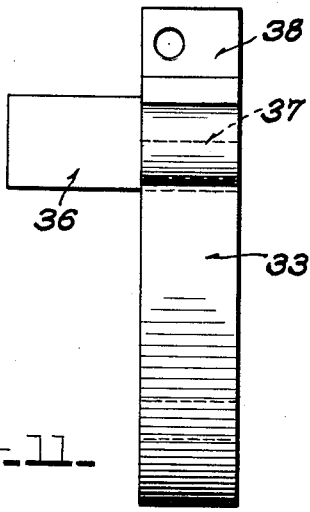
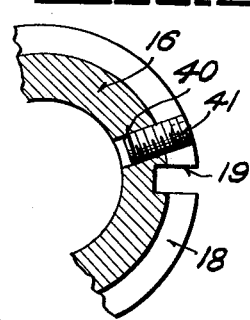
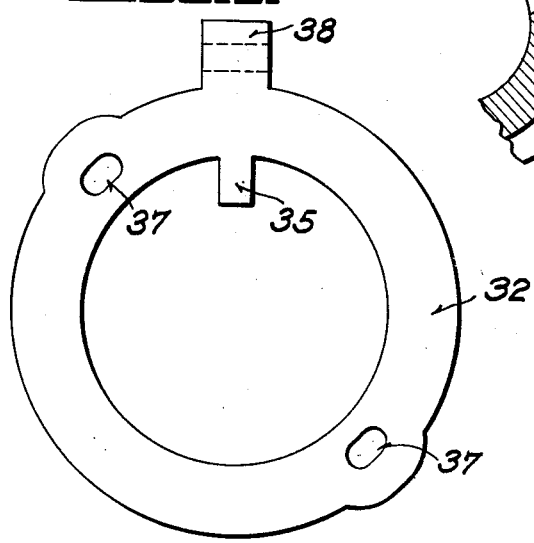
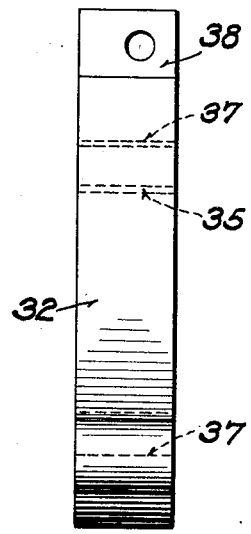
INVENTOR
DELMER F. SHERMAN,
BY H.B.Willson & Co.
ATTORNEYS Patented June 3, 1952

2,599,136

UNITED STATES PATENT OFFICE 2,599,136

ADJUSTABLE WHEEL AND AXLE ASSEMBLY

Delmer F. Sherman, New Plymouth, Idaho

Application June 21, 1950, Serial No. 169,412

3 Claims. (Cl. 301—128)

My invention relates to wheels and axles, and more particularly to an adjustable screw hub for connecting a wheel or the like to a driving axle or shaft.

Agricultural tractors now have their rear or driving wheels adjustable lengthwise of the axle sections to vary their transverse spacing according to the spacing of the rows of crops to be cultivated and for other reasons. When such transverse spacing of the tractor wheels or tread members must be changed, it is frequently necessary to resort to the time-consuming and back-breaking jobs of jacking up the tractor and lifting heavy wheels around. To obviate such difficult and laborious work various adjustable wheel mountings have been proposed, and in some the adjustment of the wheels may be accomplished by the tractor power through the use of screw threaded axle sections and screw threaded wheel hubs thereon.

It is an object of this invention to provide improved adjustable screw hub structure of the above indicated character by means of which the wheels may be quickly and easily adjusted to the desired width by the power of the tractor, and thus save much time and physical effort.

Another object of the invention is to provide a structure of this character which is simple, strong and durable, and which may be easily maintained in proper operating condition so that the adjustment may be accomplished quickly and with little effort.

The above and other objects and advantages are attained by the preferred embodiment of the invention hereinafter described and claimed, and illustrated in the accompanying drawings, in which:

Fig. 1 is a diagrammatic rear elevation of parts of a tractor showing the rear axle housing containing the differential gearing, the screw threaded axle sections and the two adjustable driving wheels mounted in accordance with my invention.

Fig. 2 is a side elevation on an enlarged scale, of a portion of an axle with the improved adjustable screw hub assembly, a portion of the wheel being shown in section;

Figs. 3 and 4 are transverse sections taken on the lines 3—3 and 4—4 respectively of Fig. 2 looking in the directions of arrows;

Figs. 5 and 6 are side and edge views respectively of the hub member;

Figs. 7 and 8 are side and edge views respectively of the outer key member or ring;

Figs. 9 and 10 are side and edge views respectively of the inner key member or ring; and Fig. 11 is a detail section on line 11—11 of Fig. 2.

Referring more in detail to the drawings 15 denotes the two driving wheels of a tractor or the like, 16 the two axle members or sections along which the wheels are adjustable to vary their transverse spacing, and 17 the rear axle housing containing the usual differential gearing, these parts being conventionally illustrated in Fig. 1. The two axle sections 16 have external screw threads 18, the threads on one section spiraling in the opposite direction from those on the other section. The threads are preferably of the square type and may be forged or machined as a part of the axle, or cast on sleeves telescoped on the axle proper and suitably secured thereto. These right and left hand threaded axle sections have larger diameters than the usual axles to give more mechanical advantage so that the wheels may be screwed in or out under the power of the tractor. Each axle is formed with a single longitudinal slot or keyway 19 of substantial size.

The wheels 15 include tread portions 20 and hub portions 21 connected by spoke or web portions 22. These parts may be variously constructed. The tread portions may be rubber tired. The main hub member may be cast as part of a cast wheel. As shown, the main hub member 21 has a radially extending flange 23 with an annular series of holes 24 to receive bolts or other fastenings 25 to secure it to the spoke portion 22. The bores of the two hub members are formed with internal screw threads 26 to correspond with the threads on the axle sections, and each bore is formed with a groove or keyway 28 corresponding in size to the keyways in the axle sections. The two hub members are of substantially cylindrical form and have flat inner and outer faces on which are formed thrust lugs 29 and 30 for a purpose hereinafter explained. The lugs 29 project toward the inner ends of the axle sections while the lugs 30 project toward their outer ends, the lugs on each hub member being disposed adjacent the outer periphery of the latter and being also disposed at equal distances circumferentially from the radial plane of the keyway 28 as seen in Figs. 5 and 6. The hub members 21 are also formed at diametrically opposite points with bolt receiving openings 31.

The wheels are adapted to be locked to the axles, after they have been adjusted, by means of two key-carryying rings or sleeves 32 and 33 which are positioned against the flat faces of the hub portions 21 and secured by clamping bolts 34. These ring members 32 and 33 are not internally threaded and have smooth bores with a sliding fit and bearing on the axle threads. The inner rings 32 have keys 35 corresponding in length to the thickness of the rings for engagement with the axle keyways 19, while the outer rings 33 have much longer and higher keys 36. The latter project from the inner faces of the flat rings 33 and extend into the keyways 28 in the hub members 21 as well as into the keyways 19 of the axle sections. Both rings 32 and 33 are formed at diametrically opposite points with circumferentially extending slots 37 adapted to receive the bolts 34 which also pass through the openings 31 in the hub member between the rings. Also formed on the ring members 32 and 33 are outwardly projecting ears 38 disposed at points radially outwardly from the keys of said ring members. These ears are formed with tangentially extending screw threaded openings to receive set screws or bolts 39 adapted to thrust against the lugs 29, 30. It will be seen on reference to Fig. 2 that when the parts are assembled the cap screw or bolt 39 in the ear 38 on the inner ring 32 will thrust against the lug 29 and tend to relatively move said ring and the hub member in a circumferential direction, while the screw 39 in the lug on the outer ring 33 will project in the opposite direction and thrust against the other lug 30 on the hub member to produce a similar relative rotation of the parts. Such relative circumferential movement of the parts 21, 32, 33 will place lateral tension on the keys in the keyways and all slack can be taken up whether it is due to wear or to imperfect fitting of the parts. The elongated holes or slots 37 permits sufficient adjustment to compensate for all wear. By making the key in the inner ring member short, said member may be positioned close to the housing 17 and the hub member may be adjusted close to it. When the ring members 32, 33 of each unit are clamped by the bolts 34 against the hub member 21 they form a part of the hub assembly and provide a strong and effective hub for the wheel.

When it is desired to change the transverse spacing of the wheels on the axle sections, the bolts 34 are removed so that the members 32 and 33 may be moved away from the opposite faces of the hub members 21. When the keys 36 leave the keyways in the hubs, the latter are no longer locked to the axle sections. Hence when the axle sections are driven through the differential gearing the wheels will be caused to move inwardly closer to each other or outwardly away from each other according to the direction of rotation of the axle sections. When the wheels have been slid along the ground to the desired spacing, the key-carrying members are replaced against the opposite side of the hub members so that the latter will be locked by the keys 36 to turn with the axle sections. The bolts 34 are then replaced, and after the pressure screws or bolts 39 are tightened against the lugs 29, 30 to take up slack, the bolts 34 are tightened to securely fasten the hub parts together. In order to prevent the hub parts from being moved off the axle sections, I provide adjacent their outer ends screw threaded, radially extending openings or sockets 40 to receive threaded stop pins 41. These stops 41 have in their outer ends hexagonal or other flat walled sockets to receive a wrench or turning tool. The sockets 40 are of sufficient depth to permit the outer ends of the screw pins 41 to be moved beneath the bottoms of the threads 18 to permit of the removal of the hub members from the axle sections when that is desired.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a wheel and axle assembly of the type in which the axle is externally screw threaded and axial adjustment of the wheel is effected by relative rotation of the two, and wherein the axle has an external keyway utilized for locking the wheel in a selected position of axial adjustment, the improvement comprising a hub member for carrying the wheel and provided with an internal screw thread to mate with the axle screw thread and further provided with an internal keyway to aline with the axle keyway, locking members disposed on opposite sides of said hub member and slidable on the axle, said locking members having keys slidable in the keyway of the axle, at least one of said keys being adapted to extend into the keyway in said hub member for holding the latter against rotation on the axle, slack-take-up means between said hub member and said locking members including tension screws carried by one member and reacting against another member to relatively rotate the two members, and removable fastenings for securing said locking members on opposite sides of said hub member.

2. In a wheel and axle assembly of the type in which the axle is externally screw threaded and axial adjustment of the wheel is effected by relative rotation of the two, and wherein the axle has an external keyway utilized for locking the wheel in a selected position of axial adjustment, the improvement comprising a hub member for carrying the wheel and provided with an internal screw thread to mate with the axle screw thread and further provided with an internal keyway to aline with the axle keyway, said hub member being of annular form and having flat sides formed with a pair of oppositely projecting thrust lugs which are circumferentially spaced, inner and outer key-carrying rings disposed on opposite sides of said hub member and slidable in the axle, said rings having keys slidable in the axle keyway, the key on at least one of said rings being movable into the keyway in said hub member for holding the latter against rotation on the axle, said rings being formed with ears having tangentially-extending, screw threaded openings, thrust screws in the latter and positioned to engage said thrust lugs, and removable fastenings for securing said rings on opposite sides of said hub member.

3. The structure of claim 2 in which said removable fastenings are bolts passed through openings in said hub member and through arcuate slots in said rings.

DELMER F. SHERMAN.

REFERENCES CITED

The following references are of record in the file of this patent:

UNITED STATES PATENTS

| Number | Name | Date |
|---|---|---|
| 2,235,457 | Lorimor | Mar. 18, 1941 |
| 2,324,681 | Dekker | July 20, 1943 |